(12) United States Patent
Cortés et al.

(10) Patent No.: US 8,408,495 B2
(45) Date of Patent: Apr. 2, 2013

(54) FITTINGS FOR ATTACHING THE VERTICAL TAIL STABILIZER OF AN AIRCRAFT

(75) Inventors: Diego Folch Cortés, Madrid (ES); Enrique Vera Villares, Madrid (ES); Javier Cabeza Huertas, Segovia (ES); José María Pina López, Madrid (ES); Elena Arévalo Rodríguez, Madrid (ES)

(73) Assignee: Airbus Operations, S.L., Madrid (ES)

( * ) Notice: Subject to any disclaimer, the term of this patent is extended or adjusted under 35 U.S.C. 154(b) by 249 days.

(21) Appl. No.: 12/714,333

(22) Filed: Feb. 26, 2010

(65) Prior Publication Data
US 2010/0264271 A1   Oct. 21, 2010

(30) Foreign Application Priority Data
Apr. 21, 2009   (ES) ................... 200901039

(51) Int. Cl.
*B64C 1/26* (2006.01)
(52) U.S. Cl. .................. 244/131; 244/87
(58) Field of Classification Search .......... 244/131, 244/132, 87, 91, 119, 117 R
See application file for complete search history.

(56) References Cited

U.S. PATENT DOCUMENTS

| | | | |
|---|---|---|---|
| 2005/0262682 A1 | 12/2005 | Grover et al. | 29/428 |
| 2006/0018710 A1* | 1/2006 | Durand et al. | 403/408.1 |
| 2007/0267541 A1* | 11/2007 | Honorato Ruiz et al. | 244/87 |
| 2010/0108803 A1* | 5/2010 | Arevalo Rodriguez | 244/99.2 |
| 2010/0155532 A1 | 6/2010 | Ariza Martin et al. | 244/119 |

FOREIGN PATENT DOCUMENTS

| | | |
|---|---|---|
| DE | 10 2005 003 296 A1 | 7/2006 |
| WO | 2010/070184 A1 | 6/2010 |

* cited by examiner

*Primary Examiner* — Tien Dinh
*Assistant Examiner* — Richard R Green
(74) *Attorney, Agent, or Firm* — Seed IP Law Group PLLC

(57) ABSTRACT

A fitting is provided to fix a vertical tail stabilizer of an aircraft to a composite skin and a composite frame of the aircraft in an area of a rear fuselage thereof. The fitting includes a first composite piece having lugs to attach to the vertical tail stabilizer and having vertical walls to fix the fitting to the composite frame of the rear fuselage. The fitting further includes at least one pair of additional composite pieces, each having a horizontal wall to fix the fitting to the composite skin of the rear fuselage. A second pair of additional composite pieces may be provided to further secure the fitting to the skin of the aircraft.

15 Claims, 4 Drawing Sheets

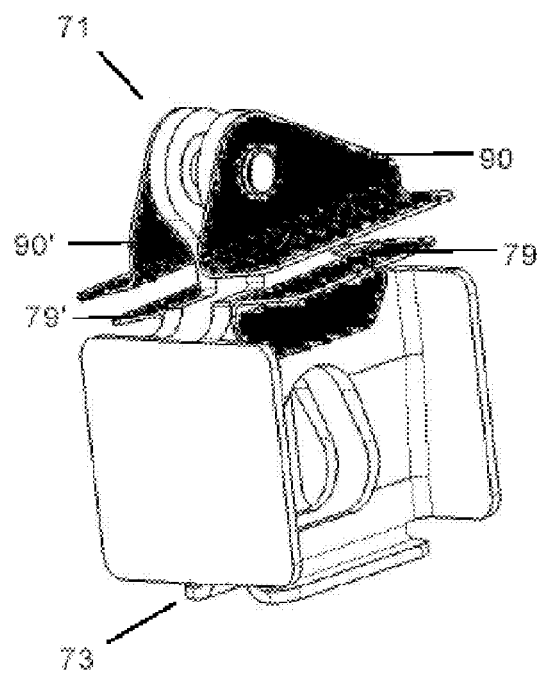
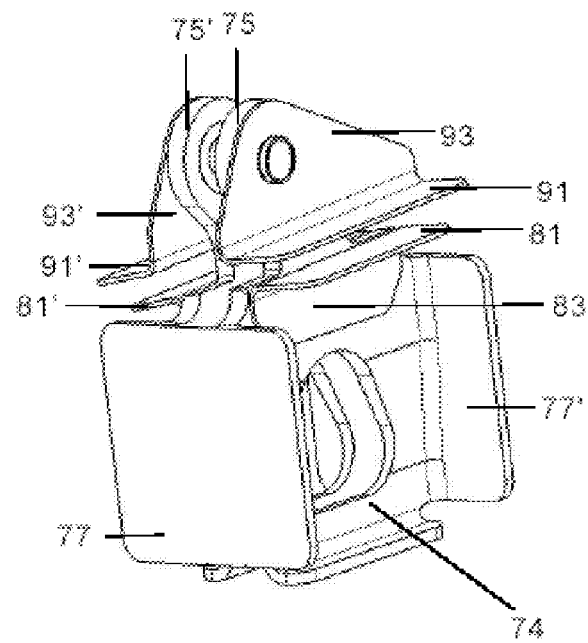
FIG. 6a
FIG. 6b
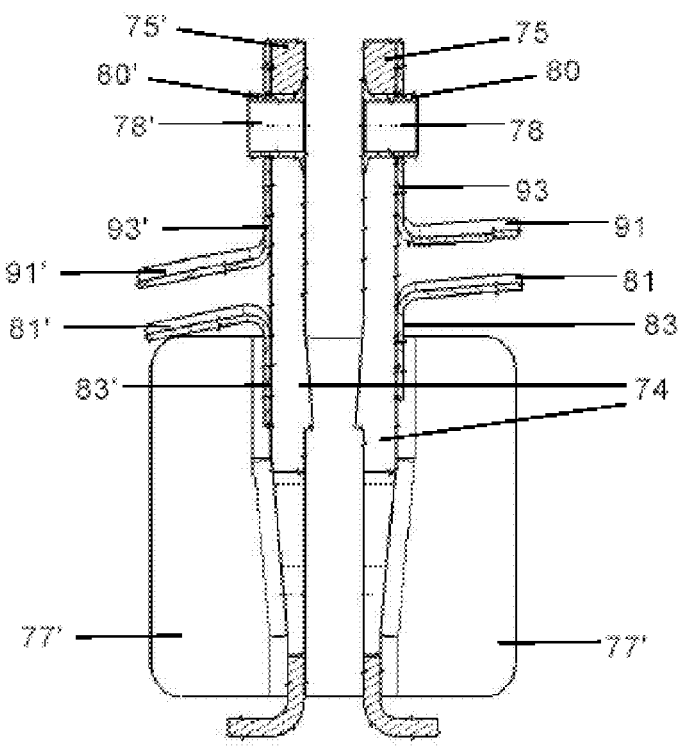
FIG. 7

FITTINGS FOR ATTACHING THE VERTICAL TAIL STABILIZER OF AN AIRCRAFT

CROSS-REFERENCE TO RELATED APPLICATION

This application claims the benefit under 35 U.S.C. §119(e) of Spanish Patent Application No. ES 200901039, filed Apr. 21, 2009, which application is incorporated herein by reference in its entirety.

FIELD OF THE INVENTION

The present invention relates to fittings for attaching the vertical tail stabilizer of an aircraft and more particularly to fittings manufactured in composite.

BACKGROUND OF THE INVENTION

Despite the trend in recent years to implement the use of composites, such as the CFRP (Carbon Fiber Reinforced Plastic), in the largest possible number of components of an aircraft due to the weight savings that this material entails with respect to aluminum (the preferred metallic material used in aircraft), most aircraft manufacturers are hesitant to use carbon fiber to manufacture fittings, because their complexity makes them rather expensive to manufacture.

This is especially applicable to the fittings used for attaching vertical tail stabilizers which continue to be made with metallic materials.

The use of metal fittings as elements for attaching components made with composite materials in fuselage areas of the aircraft also made with composite materials brings forth several problems, such as their greater weight, and particularly those problems relating to the reduction of the effective skin area and to the assembly difficulties.

It is possible to manufacture fittings with composites having a shape similar to that of metallic fittings but, besides the cost resulting from the complex shape, they present, among others, the drawback that it is very difficult to achieve with this shape an optimized laminate structure able to perform the required load distribution.

The present invention aims to solve these drawbacks.

SUMMARY OF THE INVENTION

An object of the present invention is to provide fittings integrally manufactured with composite material for attaching the vertical tail stabilizer in the rear area of a structured aircraft fuselage based on a skin manufactured with composite material as a unitary piece, and on frames also manufactured with composite material.

It is another object of the present invention to provide fittings for fixing the vertical tail stabilizer in the rear area of an aircraft fuselage which can be easily assembled.

In a first step, these and other objects are achieved with a fitting comprising:
  A first piece manufactured with composite material comprising lugs for fixing the vertical tail stabilizer and vertical walls for fixing the fitting to the fuselage frames.
  At least one pair of additional pieces manufactured with composite material comprising horizontal walls for fixing the fitting to the fuselage skin.
In a first kind of fitting, these pair of additional pieces have an angular shape and are designed so that their horizontal walls are fixed to the skin by their inner face, and so that their vertical walls are fixed to the first piece. A suitable fitting for fixing the vertical tail stabilizer with a vertical load is thus achieved.

In another kind of fitting, the fitting also comprises a second pair of additional pieces, also manufactured with a composite material, with an angular shape, designed so that their horizontal walls are fixed to the skin by their upper face, being their vertical walls fixed to the lugs of the first piece. A suitable fitting for fixing the vertical tail stabilizer with an inclined load is thus achieved.

In a second step, these and other objects are achieved by providing assembly processes for these fittings.

In a preferred embodiment, the assembly of the fitting intended for fixing the vertical tail stabilizer with a vertical load comprises the following steps:
  Assembling the first piece on the inner part of the skin, having previously incorporated the bushings in the boreholes of the lugs.
  Assembling the pair of additional pieces fixing the horizontal walls to the skin by means of a mechanical attachment and fixing the vertical walls to the first piece by means of a mechanical attachment or a chemical attachment.

A very simple assembly process requiring no additional tasks in the final assembly line is thus achieved.

In another preferred embodiment, the assembly of the fitting intended for fixing the vertical tail stabilizer with an inclined load comprises the following steps:
  Assembling the first piece on the inner part of the skin.
  Assembling the first pair of additional pieces fixing the horizontal walls to the skin by means of a mechanical attachment and fixing the vertical walls to the first piece by means of a mechanical attachment or a chemical attachment.
  Assembling the second pair of additional pieces fixing the horizontal walls to the skin by means of a mechanical attachment and fixing the vertical walls to the lugs by means of a chemical attachment or by means of installing the bushings which must be incorporated in the boreholes of both elements.

A simple assembly process for this type of fitting is thus achieved.

Other features and advantages of the present invention will become apparent from the following detailed description of illustrative embodiments of its object in relation to the attached drawings.

DESCRIPTION OF THE DRAWINGS

FIGS. 6a and 6b are perspective views of a fitting for fixing a vertical tail stabilizer with an inclined load according to the present invention.

FIG. 7 is a cross-section view of the fitting of FIGS. 6a and 6b.

DETAILED DESCRIPTION OF THE INVENTION

Figure 1:
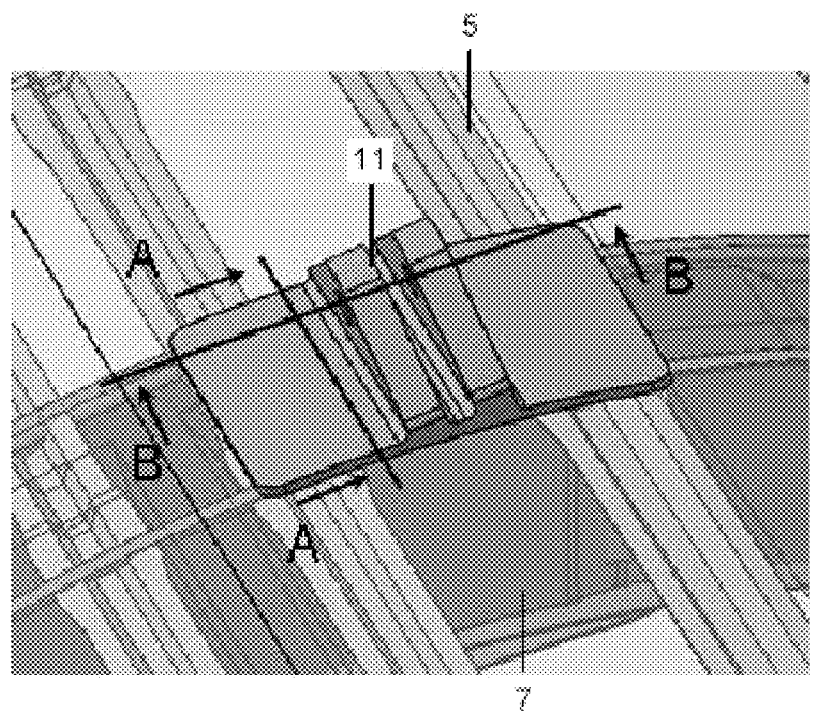
FIG. 1 is a perspective view of a fitting for fixing a vertical tail stabilizer fixed on an aircraft rear fuselage, according to the known art.
Figure 2:
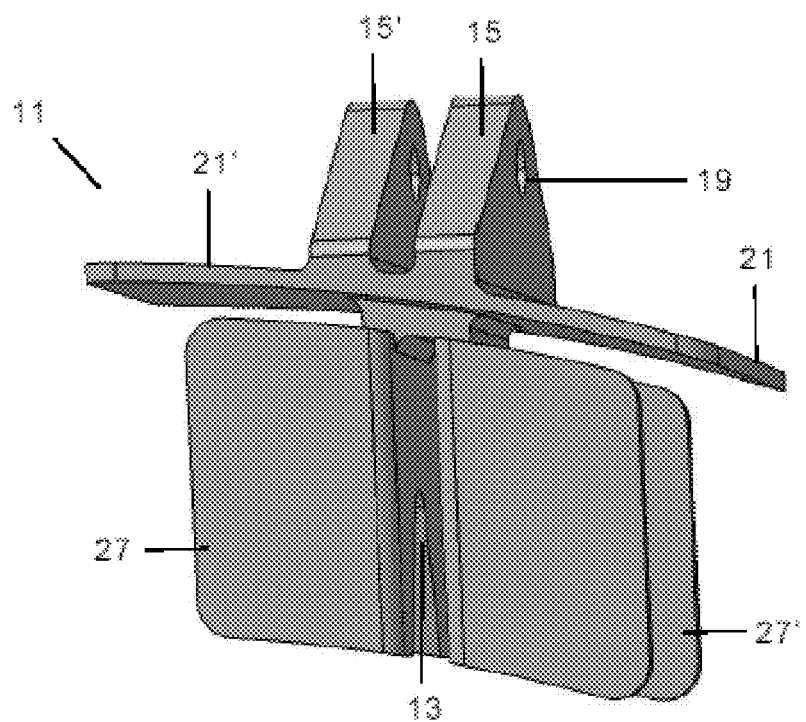
FIG. 2 is a perspective view of the fitting of FIG. 1.

In order to better understand the invention, we will first describe a fitting for fixing a vertical tail stabilizer known in the art in relation to FIGS. 1-3.

Figure 3A:
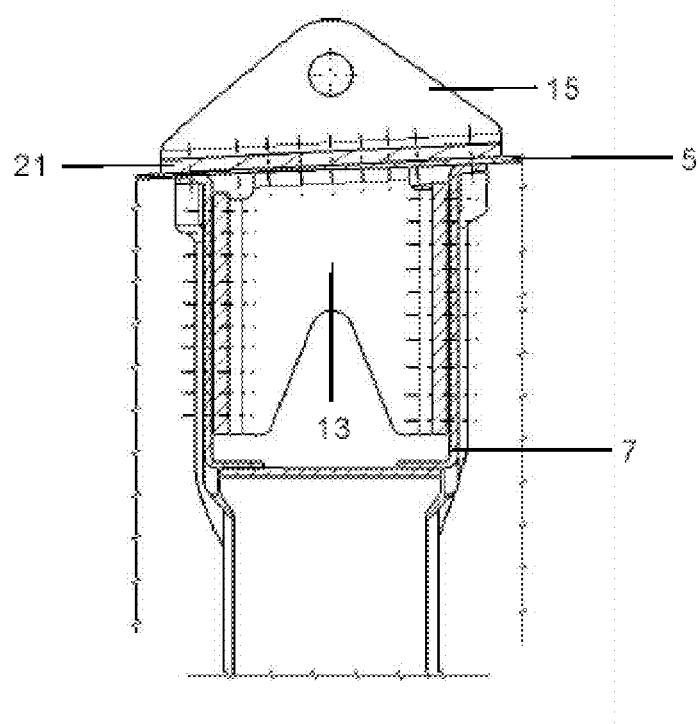
FIGS. 3a and 3b are, respectively, cross sections of FIG. 1 according to axes A-A and B-B.
Figure 3B:
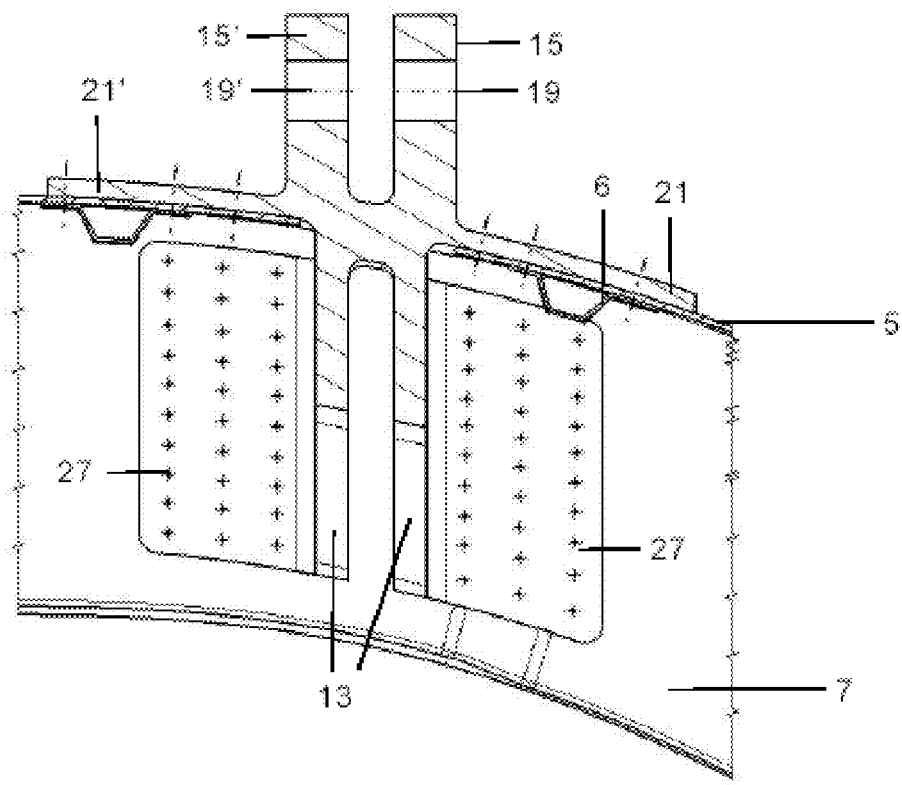

It relates to a fitting 11 of a piece comprising lugs 15, 15' to receive the load element of the vertical stabilizer, a pair of horizontal walls 21, 21' which are fixed to the skin 5 and a pair of vertical walls 27, 27' (continuous or segmented in two parts as shown in FIG. 2, depending on the location of the fitting) which are fixed to the frames 7 of the fuselage. FIGS. 3a and 3b show the corresponding attachments in detail.

As a person skilled in the art will understand, the terms "horizontal" and "vertical" must not be interpreted in a strict geometric sense, but rather as terms to merely identify the mentioned components of the fitting. In addition, the shape of the central body 13 of the fitting 11 can differ from some fittings to others depending on their location.

As previously indicated, the basic problems brought forth with metallic fittings having the shape of fitting 11, apart from their weight, are determined by their assembly conditions. Since it is a unitary machined piece, the adjustment for the assembly must be done in contact with the skin 5 and the boreholes 19, 19' of the lugs 15, 15' must be re-worked in situ in order to assure that their axis is located in the correct position, which requires an in situ installation of the bushings that must be assembled therein in order to adjust to the attachment bolt for fixing the element of the vertical tail stabilizer with the lugs 15, 15' between which it is introduced.

These same types of problems will occur in the case of a fitting of composite material having a similar shape and, in addition, the problem relating to the difficulty of optimizing its laminates, since the conditioning factors of the load distribution would require high thickness in some components, particularly in the lugs 15, 15', as suggested in the graphic depiction of FIG. 2.

In relation to the state of the art, the basic idea of the present invention is to configure the fitting in two or more parts which facilitate both the optimization of the laminates of its different components, together with its assembly.

Figure 4A:
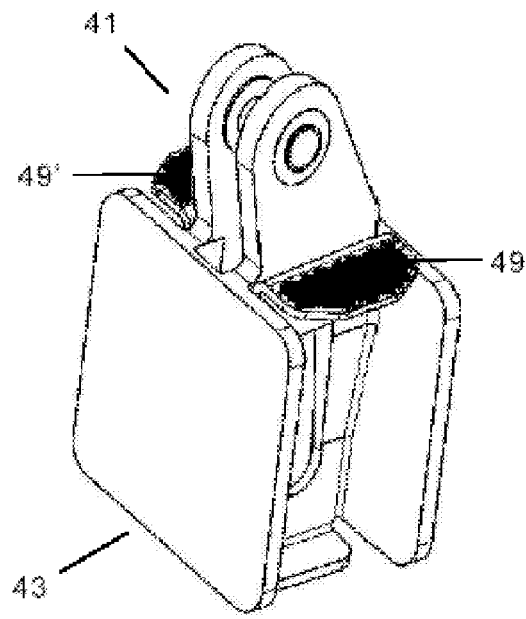
FIGS. 4a and 4b are perspective views of a fitting for fixing a vertical tail stabilizer with a vertical load according to the present invention.
Figure 4B:
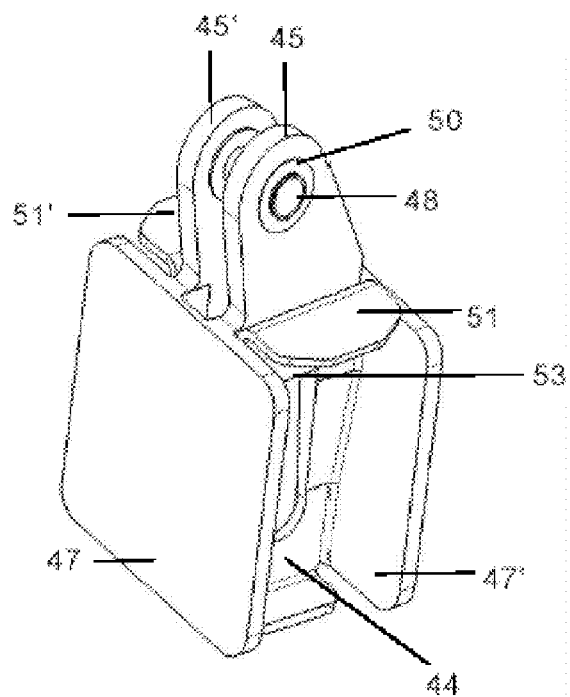
Figure 5:
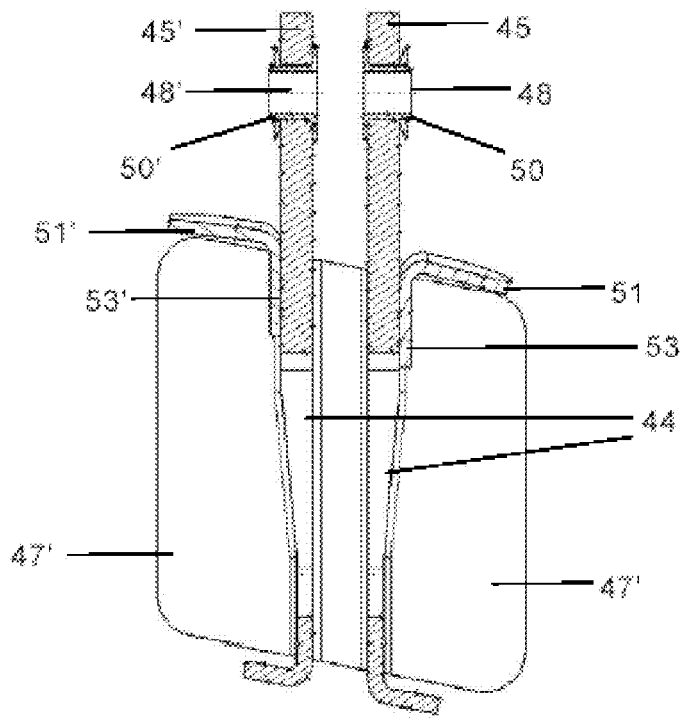
FIG. 5 is a cross-section view of the fitting of FIGS. 4a and 4b.

In a preferred embodiment of the invention for fittings for fixing vertical tail stabilizers with a vertical load, the fitting 41, illustrated in FIGS. 4-5, comprises three pieces, all of which are manufactured in a composite material:

A first piece 43 comprises lugs 45, 45' for fixing the vertical tail stabilizer and vertical walls 47, 47' for the fixing to the fuselage frames. The unitary-piece configuration of this piece 43 facilitates its assembly.

A pair of pieces 49, 49' (colored in black in FIG. 4a) having an angular shape, and having horizontal walls 51, 51' for fixing the fitting 41 to the skin 5 of the fuselage, also having vertical walls 53, 53' intended to be fixed to the central body 44 of the first piece 43.

Piece 43 is fixed on the inner part of the skin 5 of the fuselage (requiring a smaller cavity), having a configuration allowing it to be easily placed in its correct position whereby the boreholes 48, 48' of the lugs 45, 45' can incorporate the aforementioned bushings 50, 50', preventing having to assembly them in situ.

Next, the pieces 49, 49' are fixed to the central body 44 of the piece 43 in the final assembly line, whereby their correct positioning is assured, preferably by mechanical means and particularly by means of rivets, although in the case of the vertical walls 53, 53' they can also be attached by chemical means and particularly by means of adhesives. The possible gap between the horizontal walls 51, 51' and the skin 5 of the fuselage can be covered with a suitable filling layer.

This partition of the fitting 41 into pieces 43, 49, 49' allows optimizing its corresponding laminates depending on the loads each of them has to support. Piece 43 needs a high percentage of plies in the same direction as the leading load whereas pieces 49, 49' need a stacking that is more oriented towards passing the shear loads to the skin 5 of the fuselage.

In another preferred embodiment for fittings for fixing vertical tail stabilizers with an inclined load, the fitting 71, illustrated in FIGS. 6-7, comprises five pieces, all of which are manufactured with composite material:

A first piece 73 comprises the lugs 75, 75' for fixing the vertical tail stabilizer and vertical walls 77, 77' for the attachment to the fuselage frames.

A pair of pieces 79, 79' (colored in black in FIG. 6a) having an angular shape, having horizontal walls 81, 81' for fixing the fitting to the skin of the fuselage, being their vertical walls 83, 83' intended for being attached to the central body 74 of the first piece 73.

A second pair of additional pieces 90, 90' (colored in black in FIG. 6a) having an angular shape, designed so that in the operation for fixing the fitting, their horizontal walls 91, 91' are fixed to the skin by their upper face, being their vertical walls 93, 93' fixed to the lugs 75, 75' of the first piece 73.

The first piece 73 of the fitting 71 is fixed on the inner part of the skin 5 of the fuselage like in the previous case and, in a similar way, can be easily placed in its correct position whereby the boreholes 78, 78' of the lugs 75, 75' are located in their final position, without the need of being reworked.

The pieces 79, 79' are fixed, like in the previous case, to the central body 74 of the piece 73 in the final assembly line, whereby their correct positioning is assured, preferably by mechanical means and particularly by means of rivets, although in the case of the vertical walls 83, 83' they can also be attached by chemical means and particularly by means of adhesives. The possible gap between the horizontal walls 81, 81' and the skin 5 of the fuselage can be covered with a suitable filling layer.

For their part, pieces 90, 90' are fixed on the outer part of the skin 5 in the final assembly line, whereby their correct positioning is assured. Their vertical walls 93, 93' are fixed to the lugs 75, 75' by means of adhesives or simply by means of the bushings 80, 80' which are introduced in the boreholes 78, 78' of both pieces, being their horizontal walls 91, 91' fixed to the skin 5 by means of rivets. The possible gap between the horizontal walls 91, 91' and the skin 5 of the fuselage can be covered with a suitable filling layer.

This partition of the fitting 71 into pieces 73, 79, 79', 90, 90' allows optimizing its corresponding laminates depending on the loads each of them has to support.

The complementary function provided by the vertical walls 93, 93' of pieces 90, 90' for the lugs 75, 75 for withstanding the inclined load of the stabilizer can be observed in this sense. In fact, and as it is shown in FIGS. 6a and 6b, the surface of these vertical walls 93, 93' is larger than that of the lugs 75, 75'.

It must be taken into account to that respect that when the load acting on the fitting 71 does not vertically comes into contact with the lugs 75, 75', the direction of the load does not coincide with the direction of 0° of its laminates, which is the main one, which would force, when using the conventional configuration, to a very high thickness of the lugs 75, 75', causing the length of the bushings 80, 80' to possibly be greater than the distance between said lugs 75, 75'.

The modifications comprised within the scope defined by the following claims can be introduced in the embodiments described above.

The invention claimed is:

1. A fitting adapted to fix a vertical tail stabilizer of an aircraft to a composite frame of the aircraft in an area of a rear fuselage thereof and to a composite skin of the rear fuselage that surrounds the frame, the fitting comprising:
   a first piece manufactured with a composite material having lugs configured to attach to the vertical tail stabilizer and having vertical walls configured to fixedly attach the fitting directly to the composite frame of the rear fuselage with the lugs extending through an aperture in the composite skin of the rear fuselage; and
   at least one pair of additional pieces manufactured with a composite material, each of the additional pieces having a horizontal wall configured to fixedly attach the fitting directly to the composite skin of the rear fuselage of the aircraft.

2. The fitting according to claim 1 wherein each of the additional pieces has an angular shape and is adapted such that, when the fitting is installed, the respective horizontal wall of each additional piece is directly fixed to the composite skin of the rear fuselage of the aircraft and a respective vertical wall of each additional piece is directly fixed to the first piece.

3. The fitting according to claim 2, further comprising:
   a second pair of additional pieces each having an angular shape which is adapted such that, when the fitting is installed, a respective horizontal wall of each of the second pair of additional pieces is directly fixed to the composite skin of the rear fuselage of the aircraft and a respective vertical wall of each of the second pair of additional pieces is directly fixed to a respective one of the lugs of the first piece.

4. The fitting according to claim 3, wherein a respective surface of the vertical walls of the second pair of additional pieces is larger than a respective surface of the lugs of the first piece.

5. The fitting according to claim 3 wherein the fitting is configured such that, when the fitting is installed, the respective horizontal wall of each of the second pair of additional pieces is attachable directly to the composite skin by a lower face of the respective horizontal wall.

6. The fitting according to claim 2 wherein the fitting is configured such that, when the fitting is installed, the respective horizontal wall of each of the additional pieces is attachable directly to the composite skin by an upper face of the respective horizontal wall.

7. A method of installing a fitting which is adapted to fix a vertical tail stabilizer of an aircraft to a frame of the aircraft in an area of a rear fuselage and to a skin of the rear fuselage that surrounds the frame, the method comprising:
   positioning a first composite piece of the fitting through an aperture in the skin of the rear fuselage of the aircraft, the first composite piece having lugs to attach to the vertical tail stabilizer;
   fixedly attaching horizontal walls of a first pair of angular composite pieces of the fitting directly to the skin of the rear fuselage of the aircraft via mechanical attachment; and
   fixedly attaching vertical walls of the first pair of angular composite pieces of the fitting directly to the first composite piece via mechanical or chemical attachment.

8. The method of claim 7, further comprising:
   fixedly attaching horizontal walls of a second pair of angular composite pieces to the skin of the rear fuselage of the aircraft via mechanical attachment; and
   fixedly attaching vertical walls of the second pair of angular composite pieces directly to the lugs of the first composite piece.

9. The method of claim 8 wherein fixedly attaching the vertical walls of the second pair of angular composite pieces directly to the lugs includes fixedly attaching the vertical walls of the second pair of angular composite pieces directly to the lugs via chemical attachment.

10. The method of claim 8 wherein fixedly attaching the vertical walls of the second pair of angular composite pieces to the lugs includes installing bushings through boreholes in the second pair of angular composite pieces and boreholes in the lugs.

11. The method of claim 7, further comprising:
    installing bushings in boreholes of the lugs of the first composite piece of the fitting prior to positioning the first composite piece through the aperture in the skin of the rear fuselage of the aircraft.

12. A fitting configured to couple a vertical tail stabilizer of an aircraft to a frame of a rear fuselage of the aircraft and to a skin of the rear fuselage that surrounds the frame, the fitting comprising:
    a first composite component having lugs adapted to couple to the vertical tail stabilizer and having a pair of opposing walls transverse to the lugs to fixedly attach the first composite component directly to the frame of the rear fuselage; and
    at least one pair of additional composite components adapted to fixedly attach directly to the skin of the rear fuselage and to fixedly attach directly to the first component such that the first component of the fitting is fixedly attached to the skin of the rear fuselage via the at least one pair of additional composite components.

13. The fitting according to claim 12 including two distinct pairs of additional composite components configured to fixedly attach to respective sides of the skin of the rear fuselage.

14. The fitting according to claim 12 wherein each of the at least one pair of additional composite components includes a horizontal wall to couple to the skin of the rear fuselage, and wherein, when the fitting is installed, the opposing walls of the first composite component are generally perpendicular to the horizontal walls of the additional composite components.

15. An aircraft comprising:
    a rear fuselage having an internal frame and a skin surrounding the internal frame;
    a vertical tail stabilizer; and
    a fitting coupling the vertical tail stabilizer to the internal frame and the skin of the rear fuselage, the fitting comprising:
      a first composite component having lugs coupled to the vertical tail stabilizer and having a pair of opposing walls transverse to the lugs fixedly attached to the internal frame of the rear fuselage; and
      at least one pair of additional composite components fixedly attached directly to the skin of the rear fuselage and fixedly attached directly to the first component such that the first component of the fitting is fixedly attached to the skin of the rear fuselage via the at least one pair of additional composite components.

* * * * *